United States Patent [19]

Laviron et al.

[11] Patent Number: 4,520,006

[45] Date of Patent: May 28, 1985

[54] PROCESS FOR THE PURIFICATION OF SULFURIC ACID BY-PRODUCT FROM BORON TRIFLUORIDE SYNTHESIS

[76] Inventors: Charles Laviron, 27 A, rue Soeur Souvier, 69005 Lyons; Henri Lecouls, 7, avenue Beauregard, 69230 Saint Genis Laval; Louis Mésaros, Avenue d'Auvergne, La Querencia, 13310 Saint Martin de Crau, all of France

[21] Appl. No.: 552,480

[22] Filed: Nov. 17, 1983

[30] Foreign Application Priority Data

Dec. 17, 1982 [FR] France ................................ 82 21203

[51] Int. Cl.$^3$ .............................................. C01B 17/90
[52] U.S. Cl. .................................... 423/531; 423/293; 423/489
[58] Field of Search .............. 55/53; 203/49; 423/528, 423/531, 293, 489

[56] References Cited

U.S. PATENT DOCUMENTS

| | | | |
|---|---|---|---|
| 3,140,244 | 7/1964 | Simek et al. | 55/53 X |
| 3,617,209 | 11/1971 | Massonne et al. | 55/53 X |
| 3,956,373 | 5/1976 | Knobloch | 423/528 X |
| 4,265,871 | 5/1981 | Felice et al. | 423/531 |

*Primary Examiner*—Thomas Wyse
*Attorney, Agent, or Firm*—Brooks, Haidt, Haffner & Delahunty

[57] ABSTRACT

A process for the purification of by-product sulfuric acid resulting from the synthesis of boron trifluoride, wherein the ratio of fluorine to boron is three or more, which process comprises entraining the by-product acid in an inert gas, the process being characterized in that before entrainment the anhydrous sulfuric acid is diluted with water in a proportion of from about one to about ten percent by weight of water with respect to the acid to be treated, the temperature being maintained above 90° C., the sulfuric acid obtained containing less than 0.003% fluorine and less than 0.005% boron, so that the quality is substantially equivalent to a sulfuric acid directly obtained by the oxidation of sulfur.

6 Claims, No Drawings

4,520,006

PROCESS FOR THE PURIFICATION OF SULFURIC ACID BY-PRODUCT FROM BORON TRIFLUORIDE SYNTHESIS

BACKGROUND OF THE INVENTION

The present invention relates to a process for purifying sulfuric acid containing boron, and more particularly, the present invention relates to a process for purification of by-product sulfuric acid from boron trifluoride synthesis.

It is known that anhydrous boron trifluoride can be obtained by the reaction of substantially anhydrous hydrofluoric acid on orthoboric, tetraboric or metaboric acids or on boric anhydride through the use of sulfuric acid in the presence of sulfuric anhydride introduced as such or in the form of oleum so as to maintain the reaction medium in a substantially anhydrous condition to produce anhydrous boron trifluoride. The use of sulfuric anhydride for dehydrating the reaction medium results in the formation of by-product sulfuric acid which must be purged. This acid, slightly contaminated with fluorine and boron compounds, cannot directly be used.

Various methods have been proposed to purify the sulfuric acid by-product from the synthesis of boron trifluoride. In German OS No. 2,027,389 a treatment with an inert gas leads to a sulfuric acid containing about 0.03 to 0.07% boron. Further, in British Pat. No. 2,050,328, the treated sulfuric acid still contains about 0.015 to 0.1% boron, even though the conditions (namely, an atomic ratio of fluorine to boron of 3 or greater) are such that the elimination of boron ought to be more favorable.

None of these prior art methods proving satisfactory, it has presently been found that a process for the purification of sulfuric acid by-product from boron trifluoride synthesis permits obtaining a quality almost equivalent to that of sulfuric acid made by the oxidation of sulfur, that is to say, a sulfuric acid containing less than 0.003% of fluorine and less than 0.005% of boron. Although it is known that to eliminate the boron contained in sulfuric acid it is necessary that it be in the form of boron trifluoride, that is to say, that the atomic ratio of fluorine to boron is greater than 3 (because when this condition is not met, the boron remains in part in the state of difluodihydroxoboric acid which cannot be eliminated from the medium by entrainment), this condition, as brought out notably in British Pat. No. 2,050,328, is insufficient to obtain sulfuric acid having the desired purity.

THE INVENTION

It has been discovered according to the present invention that it is possible to obtain by-product sulfuric acid from the synthesis of boron trifluoride containing less than 0.003% of fluorine and less than 0.005% of boron by diluting the anhydrous acid by-product with water. Briefly, according to the present invention, from about 1 to about 10% by weight of water with respect to the treated acid is added to the sulfuric acid. In certain preferred embodiments, the quantity of water added is from about 2 to about 6% by weight with respect to the acid treated. Thereafter, the acid is subjected to entrainment with an inert gas such as air, nitrogen, carbon dioxide, hydrogen, and the like.

The temperature of the reaction is maintained above 90° C. The maximum temperature cannot be stated precisely because it depends upon the behavior of the material utilized. The process can be carried out at temperatures of 160° or 170° C., but it is preferred in certain embodiments to use temperatures of from about 100° to about 120° C.

In the same way as has been mentioned above, it is necessary in the present process that the atomic ratio of fluorine to boron be 3 or more. If, exceptionally, some manufacturing irregularity occurs, it is possible to correct this ratio to result in an appropriate value.

The process of the present invention can be carried out in any appropriate installation for effecting entrainment of volatile constituents by a gas. The resulting gas containing hydrofluoric acid and boron trifluoride is washed and purified by known means, such as washing with soda, washing with a mixture of sulfuric and boric acid, and the like. The gases are thus rid of fluorine and boron and can either be recycled or discarded.

The purification apparatus per se can, for example, although the invention is not to be limited to such an arrangement, comprise a sulfuric acid-water mixer, a chamber (reactor) topped with a column. This chamber contains a gas diffuser and is fitted with an ample flow plenum. The head of the column is fitted with a gas outflow to the wash systems and the feed sulfuric acid to be treated after mixing with the water. The temperature of the system is maintained by some heating of the column and the reactor. The acid can be preheated or not. The introduction of water also causes a preheating of the acid.

The invention will be presently illustrated by the following examples, in which there is used a column having four theoretical plates. The number of plates can be varied and, concomitantly, the feed of entrainment gas. Also, the feed rates are given only as an indicative amount.

All parts, percentages, proportions and ratios herein are by weight, unless otherwise stated.

The following examples are given to illustrate embodiments of the invention as it is presently preferred to practice it. It will be understood that these examples are illustrative, and the invention is not to be considered as restricted thereto except as indicated in the appended claims.

EXAMPLE I

Utilizing an apparatus containing a volume capacity of 50 cm³ surmounted by a 50 cm high, 2 cm diameter lined column, 110 g/hr of a mixture of 104 g/hr of sulfuric acid and 6 g/hr of water is introduced over the lining. The initial composition of the acid is 102.8% total acidity, expressed as $H_2SO_4$; 1.31% fluorine; and 0.13% boron.

The mixture is preheated to 100° C. At the foot of the chamber heated to 150° C. there is introduced 60 L/hr (normal temperature and pressure) of air. The acid removed has a total acidity of 99.7%, expressed as $H_2SO_4$; less than 0.003% fluorine; and less than 0.005% boron.

By way of comparison, the same acid treated under the same conditions but without the introduction of water leads to a treated acid containing 0.3% of fluorine and 0.03% of boron.

EXAMPLE II

In the same apparatus as used in Example I, there is introduced 108 g/hr of a mixture containing 103 g/hr of the sulfuric acid to be treated and 5 g/hr of water. The acid to be treated has 101% total acidity, expressed as $H_2SO_4$; 1.28% fluorine; and 0.12% boron.

At the base of the chamber there is introduced 60 L/hr (normal temperature and pressure) of air. The temperature of the chamber is 130° C.

A treated sulfuric acid having a total acidity of 95.8%, expressed as $H_2SO_4$, less than 0.003% fluorine, and less than 0.005% boron is recovered.

EXAMPLE III

In the same apparatus used for Examples I and II, there is introduced 190 g/hr of a mixture preheated to 100° C. containing 181 g/hr of sulfuric acid to be treated and 9 g/hr of water. The acid to be treated contains 1.28% fluorine and 0.12% boron. In the chamber maintained at 110° C., there is introduced 60 L/hr (normal temperature and pressure) of air. The acid so treated contains less than 0.003% fluorine and less than 0.005% boron.

By way of comparison, the same acid treated under the same conditions without the addition of water contains 0.9% fluorine and 0.1% boron.

Thus, the considerable improvement afforded by the process of the present invention is demonstrably apparent.

What is claimed is:

1. A process for the purification of anhydrous by-product sulfuric acid which is contaminated with fluorine and boron from the synthesis of boron trifluoride, wherein the atomic ratio of fluorine to boron is three or more, which comprises diluting the anhydrous sulfuric acid with from one to ten percent water, based on the weight of sulfuric acid, and contacting the diluted acid with an inert entraining gas, the temperature of the process being greater than 90° C.

2. A process according to claim 1 in which the anhydrous sulfuric acid is diluted with from two to six percent water based on the weight of the sulfuric acid.

3. A process according to claim 1 wherein the temperature is from about 100° to about 170° C.

4. A process according to claim 1 wherein the temperature is from about 100° to about 120° C.

5. A process according to claim 1 wherein the inert gas is air, nitrogen, carbon dioxide, or hydrogen.

6. A process according to claim 1 wherein the acid is treated in an absorption column.

* * * * *